United States Patent
Yuan et al.

(10) Patent No.: US 12,050,867 B2
(45) Date of Patent: Jul. 30, 2024

(54) LANGUAGE MODEL BASED WRITING AID METHOD, DEVICE AND SYSTEM

(71) Applicants: Beijing ColorfulClouds Technology Co., Ltd., Beijing (CN); ColorfulClouds Pacific Technology Co., Ltd., Beijing (CN)

(72) Inventors: Xingyuan Yuan, Beijing (CN); Shengping Li, Beijing (CN); Da Xiao, Beijing (CN); He Yu, Beijing (CN)

(73) Assignees: BEIJING COLORFULCLOUDS TECHNOLOGY CO., LTD., Beijing (CN); COLORFULCLOUDS PACIFIC TECHNOLOGY CO., LTD., Beijing (CN)

( * ) Notice: Subject to any disclaimer, the term of this patent is extended or adjusted under 35 U.S.C. 154(b) by 292 days.

(21) Appl. No.: 17/531,543

(22) Filed: Nov. 19, 2021

(65) Prior Publication Data
US 2022/0284187 A1 Sep. 8, 2022

(30) Foreign Application Priority Data
Mar. 2, 2021 (CN) .......................... 202110230068.9

(51) Int. Cl.
*G06F 40/253* (2020.01)
*G06F 40/166* (2020.01)

(52) U.S. Cl.
CPC .......... *G06F 40/253* (2020.01); *G06F 40/166* (2020.01)

(58) Field of Classification Search
CPC ............................ G06F 40/253; G06F 40/166
See application file for complete search history.

(56) References Cited

U.S. PATENT DOCUMENTS

| 6,415,248 | B1 * | 7/2002 | Bangalore | G06F 40/253 704/E15.021 |
| 8,429,179 | B1 * | 4/2013 | Mirhaji | G06F 16/3329 707/756 |
| 8,626,681 | B1 * | 1/2014 | Jurca | G06F 40/232 706/12 |
| 9,026,432 | B2 | 5/2015 | Zangvil | |
| 2021/0374349 | A1 * | 12/2021 | Liu | G06F 16/355 |
| 2022/0138422 | A1 * | 5/2022 | Kulkarni | G06N 5/022 704/9 |

FOREIGN PATENT DOCUMENTS

| CN | 106650943 A | 5/2017 |
| CN | 109582839 A | 4/2019 |

(Continued)

*Primary Examiner* — Douglas Godbold
*Assistant Examiner* — Edward Tracy, Jr.
(74) *Attorney, Agent, or Firm* — J.C. PATENTS

(57) ABSTRACT

The present disclosure provides a language model based writing aid method, apparatus and system. The method includes: a server acquiring original text, where the original text may be writing text already generated and/or user input text; the server inputting the original text into a language model to generate a preset number of pieces of writing text, where the writing text and the original text have a correlation; the server sending the preset number of pieces of writing text to a frontend interface. The method of the present disclosure enables a computer to aide a user in text creating so that intelligence for writing aid is improved.

16 Claims, 7 Drawing Sheets

(56) References Cited

FOREIGN PATENT DOCUMENTS

| | | | |
|---|---|---|---|
| CN | 109670040 | A | 4/2019 |
| CN | 110059307 | A | 7/2019 |
| CN | 110348013 | A | 10/2019 |
| CN | 111753508 | A | 10/2020 |
| CN | 111832275 | A | 10/2020 |

* cited by examiner

LANGUAGE MODEL BASED WRITING AID METHOD, DEVICE AND SYSTEM

CROSS-REFERENCE TO RELATED APPLICATION

This application claims priority to Chinese Patent Application No. 202110230068.9, filed on Mar. 2, 2021, which is hereby incorporated by reference in its entirety.

TECHNICAL FIELD

The present disclosure relates to the field of artificial intelligence technology and, in particular, to a language model based writing aid method, apparatus and system.

BACKGROUND

With the development of computer technology and artificial intelligence technology, computer aided writing technology developed based on word processing technology is gradually maturing. The computer aided writing technology is no longer limited to providing users with auxiliary functions such as text inputting, document editing and file management, but has begun to help users to write.

At present, in the aspect of helping a user to write, computer aided writing technology is mainly used to optimize writing contents of the user. For example, when the user's vocabulary is poor, a server may use the computer aided writing technology to recommend an alternative word to the user. Alternatively, the server may also generate a polished statement according to keywords in a statement of the user.

However, in prior arts, a server normally cannot aid an author in writing creation through the computer aided writing technology.

SUMMARY

The present disclosure provides a language model based writing aid method, apparatus and system, which is directed to the problem in the prior art that an author cannot perform writing creation through aiding from the computer aided writing technology.

In a first aspect, the present disclosure provides a language model based writing aid method, including:
acquiring original text, where the original text includes writing text already generated and/or user input text, where the writing text already generated is one piece out of a preset number of pieces of writing text which are generated in a most recent time;
inputting the original text into a language model trained beforehand to generate a preset number of pieces of writing text, where contents of the writing text include text contents obtained based on an extension of the original text; and
outputting the preset number of pieces of writing text.

Optionally, when the original text includes the writing text already generated, the acquiring the original text includes:
acquiring a selecting instruction, where the selecting instruction is used to select one piece from the preset number of pieces of writing text which have already been output to be the original text, where the writing text which has already been output is the writing text already generated; and
determining target writing text according to the selecting instruction and the preset number of pieces of writing text, where the target writing text is the original text.

Optionally, the selecting instruction is a selecting instruction input by a user, or, the selecting instruction is a selecting instruction generated by a backend server according to a preset rule.

Optionally, the inputting the original text into the language model trained beforehand to generate the preset number of pieces of writing text includes:
determining a model probability of each word in a vocabulary list according to the original text and the language model;
determining a smoothed probability of each word in the vocabulary list according to the model probability and a preset smoothing algorithm; and
selecting a preset number of words randomly from the vocabulary list according to the smoothed probability, and generating a preset number of pieces of writing text.

Optionally, the method further includes:
acquiring a modification instruction, where the modification instruction includes writing text to be modified and modification contents, where the writing text to be modified is one piece of writing text out of the preset number of pieces of writing text; and
modifying the writing text to be modified according to the modification contents in the modification instruction.

Optionally, when the language model includes multiple language models for different subjects, the method further includes:
acquiring a subject instruction, where the subject instruction is used to indicate a target subject selected by a user; and
determining a language model according to the subject instruction, where the language model is to be used to generate writing text of the target subject.

Optionally, when the language model includes multiple language models for different language types, the method further includes:
acquiring a language type instruction, where the language type instruction is used to indicate a language type of input text and a language type of writing text that are selected by a user; and
determining a language model according to the language type instruction, where the language model is capable of generating, according to input text of a language type that is specified by the language type instruction, writing text of the language type that is specified by the language type instruction.

In a second aspect, the present disclosure provides a language model based writing aid apparatus, including:
an acquiring module, configured to acquire original text, where the original text includes writing text already generated and/or user input text, where the writing text already generated is one piece out of a preset number of pieces of writing text which are generated in a most recent time;
a generating module, configured to input the original text into a language model trained beforehand to generate a preset number of pieces of writing text, where contents of the writing text include text contents obtained based on an extension of the original text;
an outputting module, configured to output the preset number of pieces of writing text.

Optionally, when the original text includes the writing text already generated, the acquiring module includes:

an acquiring sub-module, configured to acquire a selecting instruction, where the selecting instruction is used to select one piece from the preset number of pieces of writing text which have already been output to be the original text, where the writing text which has already been output is the writing text already generated; and a first determining sub-module, configured to determine target writing text according to the selecting instruction and the preset number of pieces of writing text, where the target writing text is the original text.

Optionally, the selecting instruction is a selecting instruction input by a user, or, the selecting instruction is a selecting instruction generated by a backend server according to a preset rule.

Optionally, the generating module includes:

a second determining sub-module, configured to determine a model probability of each word in a vocabulary list according to the original text and the language model;

a third determining sub-module, configured to determine a smoothed probability of each word in the vocabulary list according to the model probability and a preset smoothing algorithm; and a generating sub-module, configured to select a preset number of words randomly from the vocabulary list according to the smoothed probability, and generate a preset number of pieces of writing text.

Optionally, the apparatus further includes:

a modifying module, specifically configured to: acquire a modification instruction, where the modification instruction includes writing text to be modified and modification contents, where the writing text to be modified is one piece of writing text out of the preset number of pieces of writing text; and modify the writing text to be modified according to the modification contents in the modification instruction.

Optionally, when the language model includes multiple language models for different subjects, the apparatus further includes:

a subject acquiring module, configured to acquire a subject instruction, where the subject instruction is used to indicate a target subject selected by a user; and determine a language model according to the subject instruction, where the language model is to be used to generate writing text of the target subject.

Optionally, when the language model includes multiple language models for different language types, the apparatus further includes:

a language type selecting module, configured to acquire a language type instruction, where the language type instruction is used to indicate a language type of input text and a language type of writing text that are selected by a user; and determine a language model according to the language type instruction, where the language model is capable of generating, according to input text of a language type that is specified by the language type instruction, writing text of the language type that is specified by the language type instruction.

In a third aspect, the present disclosure provides a language model based writing aid system, including: a frontend interface and a backend server;

where the frontend interface is configured to upload acquired original text to the backend server, and display writing text fed back by the backend server;

the backend server is configured to generate a preset number of pieces of writing text according to the original text, and feedback the writing text to the frontend interface.

In a fourth aspect, the present disclosure provides a readable storage medium storing thereon a computer program, when at least one processor of a server executes the computer program, the server executes the language model based writing aid method according to the first aspect and any possible design of the first aspect.

In a fifth aspect, the present disclosure provides a computer program product including a computer program, when at least one processor of a server executes the computer program, the server executes the language model based writing aid method according to the first aspect and any possible design of the first aspect.

According to the language model based writing aid method, apparatus and system provided in the present disclosure, by means of: acquiring original text, where the original text may be writing text already generated and/or user input text; inputting the original text into a language model to generate a preset number of pieces of writing text, where the writing text and the original text have a correlation; and sending the preset number of pieces of writing text to a frontend interface, an effect of generating writing text is achieved so that a server may accomplish writing creation in place of an author.

BRIEF DESCRIPTION OF DRAWINGS

In order to describe the technical solutions in the present disclosure or the prior art more clearly, the following will briefly introduce the drawings that need to be used in the description of the embodiments or the prior art. Obviously, the drawings in the following description are for some embodiments of the present disclosure. For those of ordinary skill in the art, other drawings may be obtained based on these drawings without creative efforts.

DESCRIPTION OF EMBODIMENTS

Figure 1:
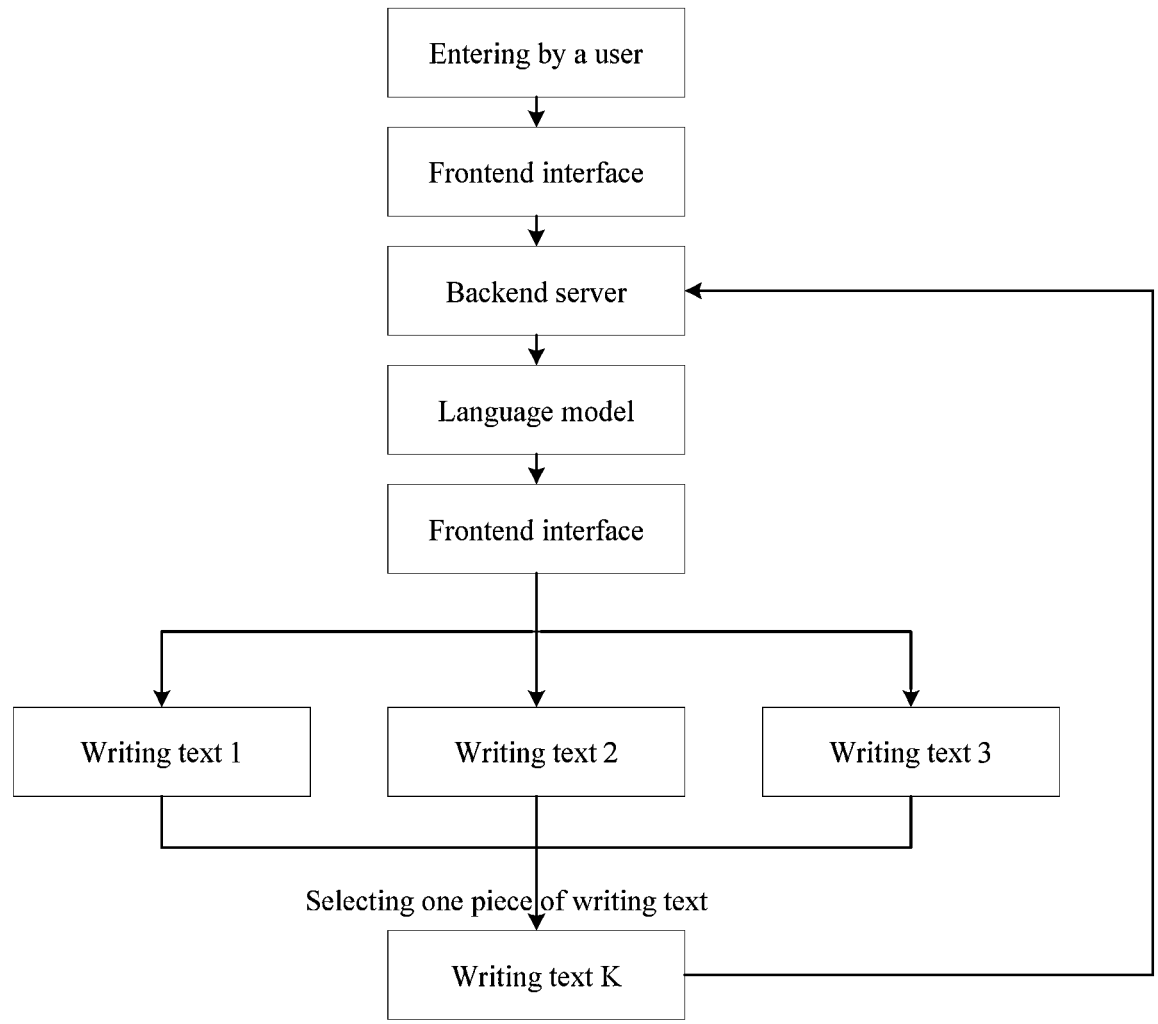
FIG. 1 is a structural schematic diagram of a language model based writing aid system according to an embodiment of the present disclosure.

In order to describe the purpose, technical solutions and advantages of the present disclosure more clearly, the technical solutions of the present disclosure will be described hereunder clearly and comprehensively in conjunction with the accompanying drawings of the present disclosure. Obviously, the described embodiments are some of, rather than all of the embodiments of the present disclosure. Based on the embodiments in the present disclosure, all other embodiments obtained by those of ordinary skill in the art without creative efforts shall fall within the protection scope of present disclosure.

It should be understood that, depending on the context, the word "if" as used herein can be interpreted as "when . . . " or "once . . . " or "in response to a determination that . . . ". Additionally, as used herein, a singular form of "a", "one" and "this" is intended to include a plural form, unless indicated otherwise in the context.

It should be further understood that the terms "comprising" and "including" indicate an existing feature, step, operation, element, component, item, type, and/or group, but do not exclude the existence, occurrence or addition of one or more other features, steps, operations, elements, components, items, types, and/or groups.

The terms "or" and "and/or" as used herein are interpreted as inclusive or to intend any one or any combination. Therefore, "A, B or C" or "A, B and/or C" means "any of the following: A; B; C; A and B; A and C; B and C; A, B and C". An exception to this definition will occur only when a combination of elements, functions, steps or operations is inherently mutually exclusive in some way.

With the development of computer technology and artificial intelligence technology, computer aided writing technology developed based on word processing technology is gradually maturing. The computer aided writing technology is no longer limited to providing users with auxiliary functions such as text inputting, document editing and file management, but has begun to help users to write.

At present, computer aided writing technology based on computer technology is normally developed focusing on databases such as a knowledge base or a knowledge graph. A server, after learning a user's keyword, can provide related information for the user according to the keyword to help the user finish writing. This computer aided writing technology is generally used for knowledge point supplement, related information expanding and the like. The implementation process is similar to data matching or database retrieval. After the computer aided writing technology provides an auxiliary material for a user, the user needs to extract useful information from the auxiliary material by himself/herself and write it into a text. For requirements of matching and retrieval, when the user inputs a same keyword, a corresponding auxiliary material is normally the same.

However, computer aided writing technology based on artificial intelligence is no longer limited to providing users with information, but has begun to aid users in writing. For example, a server may extract a keyword from input information of a user, and regenerate polished text data according to the keyword. Alternatively, the server may recommend an alternative word to the user according to the input information of the user. This computer aided writing technology is usually used for optimization of writing contents, and cannot accomplish writing directly in place of the user. In addition, through the optimization process, the server normally can only provide one optimization result for the user with respect to same contents.

With respect to the above problem, the present disclosure provides a language model based writing aid method. A server, when generating writing text for a first time, may use user input text as original text. The server inputs the original text into a language model to generate a preset number of pieces of writing text, where there is a correlation between the writing text generated for the first time and the input text. The server, when generating writing text for a second time, may use the writing text generated for the first time and/or the input text as original text. When the server uses the writing text generated for the first time as original text, the writing text generated for the first time is one piece out of a preset number of pieces of writing text which are generated for the first time, where there is a correlation between the writing text generated for the second time and the writing text generated for the first time which serves as the original text. A length of the writing text generated for the second time may be longer than a length of the writing text generated for the first time. A user may perform interaction for multiple times according to actual needs to generate final writing text. Each time when writing text is generated, the server may generate a preset number of pieces of writing text, where the preset number is a positive integer. The generation of the preset number of pieces of writing text, may increase the diversity of the writing text on the basis that continuity and logicality of the writing text are ensured. In addition, in each time of generation except the first time, a user or a server may select one piece from a preset number of pieces of writing text which are generated in a previous time to be the original text. The selection of the original text enables the writing text to be further extended on the basis of the original text, which increases the diversity of the writing text on the basis that text creating is achieved.

The technical solutions of the present disclosure will be explained in detail in the following with specific embodiments. The following specific embodiments may be combined with each other, and a same or similar concept or process may not be repeated in some embodiments.

FIG. 1 shows a structural schematic diagram of a language model based writing aid system according to an embodiment of the present disclosure. As shown in the figure, a user enters input text at a frontend interface. The frontend interface uploads the acquired input text to a backend server. The backend server inputs the input text into a language model to generate a preset number of pieces of writing text. The preset number of pieces of writing text are fed back to the frontend interface by the backend server and displayed to the user in the frontend interface. As shown in FIG. 1, the preset number of pieces of writing text may include three pieces of writing text. At the frontend interface, a user can see three pieces of writing text including writing text 1, writing text 2 and writing text 3. The user may select one piece of writing text from the three pieces of writing text, which is writing text K. The frontend interface uploads the writing text K to a backend server. The backend server may input the writing text K in the language model as original text. Based on the writing text K, the language model may generate three pieces of writing text again. When the backend server feeds back the three pieces of writing text to the frontend interface, the three pieces of writing text will be displayed at the frontend interface in place of the previous three pieces of writing text. In this interaction process, a user may select a piece of writing text for re-generation for multiple times according to actual needs.

In the present disclosure, the writing aid method is mainly executed by the backend server. The backend server may be run in the server. The server may serve as an execution body of the present disclosure to execute the language model based writing aid method according to the following embodiments. Specifically, the execution body may be a hardware device of the server, or a software application in the server for implementing the following embodiments, or a computer-readable storage medium installed with a software application for implementing the following embodiments, or software application codes for implementing the following embodiments.

Figure 2:
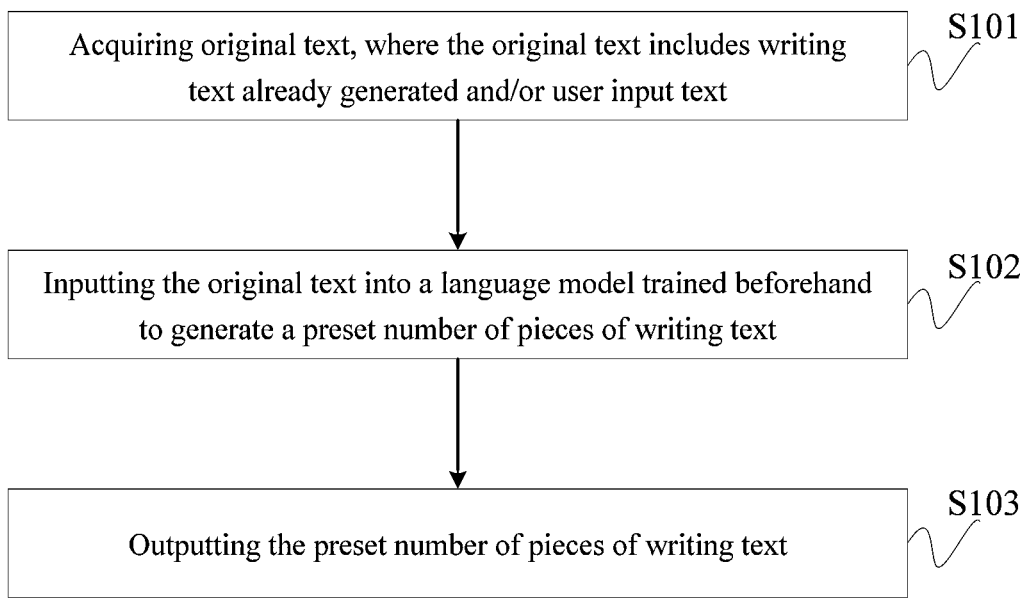
FIG. 2 is a flowchart diagram of a language model based writing aid method according to an embodiment of the present disclosure.

FIG. 2 shows a flowchart diagram of a language model based writing aid method according to an embodiment of the present disclosure. On the basis of the embodiment shown in FIG. 1, as shown in FIG. 2, taking a server as an execution body, the method according to this embodiment may include the following steps.

S101, acquiring original text, where the original text includes writing text already generated and/or user input text, where the writing text already generated is one piece out of a preset number of pieces of writing text which are generated in a most recent time.

In the embodiment, a server acquires original text, where the original text is original text used for generation of writing text for the present time. Original text is used every time for generation of writing text, where the writing text is text obtained based on an extension of the original text. The original text acquired by the server may be the input text entered at a frontend interface by a user. Or, the original text may be writing text already generated by a server in a preceding interaction process. Or, the original text may include both of the writing text already generated and the input text.

When the original text includes writing text already generated by a server in a preceding interaction process, the writing text is writing text generated for a user in a previous time. For example, writing text is currently generated for a user for a fifth time, in the fifth time to generate the writing text, the original text acquired by the server is one piece out of pieces of writing text that are generated by the server in a fourth time.

When the original text includes input text, the server does not limit the input text. For example, the input text may be the beginning, a dialogue, a question, an event title of a novel or the like.

S102, inputting the original text into a language model trained beforehand to generate a preset number of pieces of writing text, where contents of the writing text include text contents obtained based on an extension of the original text.

In the embodiment, once acquiring the original text, the server inputs the original text into a language model. The language model can generate a preset number of pieces of writing text based on the original text, where the preset number is a positive integer. Where, the writing text and the original text have a correlation. When the preset number is greater than 1, multiple pieces of writing text generated by the server are different pieces of writing text, and the multiple pieces of writing text have a certain correlation which is originated from the same original text.

In an example, the server needs to perform pre-processing on the original text before inputting the original text into the language model.

In the example, the process of pre-processing includes the following steps:

Step 1, the server performs text cleaning on the original text.

In this step, once acquiring the original text, the server traverses the original text and deletes blank characters in the original text. Since the original text may include any content, valid characters in the original text are not edited during the text cleaning process. The valid characters in the original text include any characters except the blank characters.

The server may also unify the characters in the original text. For example, when the original text includes full-width and half-width characters, the server may uniformly modify the half-width characters into full-width characters.

Step 2, the server performs tokenizing on the original text.

In this step, the server performs a tokenizing application on the cleaned original text. The tokenizing method may be existing tokenizing methods such as Bert Tokenizer, Roberta Tokenizer, and GPT2 Tokenizer. Or, the tokenizing method may also be an improved method.

In the process of tokenizing, the server splits Chinese in the original text by characters, while splits English in the original text by words. The server writes each split Chinese character and each split English word into a Token list of the original text in order. The server determines an ID corresponding to each character or word according to a preset vocabulary list.

Where, the characters and words in the vocabulary list may be determined according to characters and words that are commonly used. After determining the characters and words in the vocabulary list, the server may generate the ID of each character and word according to the sequence of each character and word in the vocabulary list.

The server uses the ID of each character or word to replace the character or word in the Token list to obtain a Token id list, where the respective ID in the Token id list corresponds to the respective character or word in the Token list.

Step 3, the server inputs the Token id list into the language model.

In this step, the server inputs the processed Token id list into the language model. The language model generates writing text according to the contents in the Token id list.

In an example, the language model is used to generate novels.

In this example, when the language model is used to generate novels, and the preset number is greater than 1, the multiple pieces of writing text generated by the language model may be different branches of a same story line. The same story line is the story line of the original text. The different branches are extended contents randomly generated by the language model according to the original text.

For example, in the first time, the original text is the input text. At this time, the server extends the original text to obtain three different story lines with the same points. The three different story lines with the same points are three novels corresponding to three pieces of writing text. In the second time, the original text is one out of the three novels that are output in the first time. At this time, the server continues to extend the story line based on the story line of the novel according to the original text. Therefore, the story line of the three novels generated in the second time is obtained by extending the story line of the respective original text. By such analogy, when the server generates multiple times, there is still a correlation between the story line of each novel generated by the language model and the input text. Moreover, in the process of generation for multiple times, the three pieces of writing text generated in each time are all randomly generated on the basis of the original text. Therefore, the extension direction for the writing text generated in each time is unpredictable. This unpredictability increases the diversity of the writing text and reduces the probability of replication of the writing text.

In addition, if the server selecting original text and generating new writing text are used as an entirety for one-time generation of writing text, the server may generate writing text for any number of times. That is, whenever the server acquires the original text, it generates new writing text according to the original text.

Each time when the writing text is generated, the length of the writing text at this time is a preset length. The preset length may be a length of writing text set by a user before the creation at this time is started. Or, the preset length may be a length of writing text preset at this time in the server. Or, the preset length may also be a length of writing text calculated by the server according to a preset algorithm and the length of the original text.

For example, the server may be preset with 100 lengths. When writing text for a user is generated for a first time, the server uses a first length of the 100 lengths. When writing text for the user is generated for a tenth time, the server uses a tenth length of the 100 lengths. Alternatively, the server may determine that a length of writing text is 1.5 times the length of the original text. When a length of the original text is 10,000 words, a length of writing text is 15,000 words.

In another example, the language model may also be used to generate an article of a poem, a prose, a popular science article or other carriers.

S103, outputting the preset number of pieces of writing text.

In the embodiment, once acquiring the preset number of pieces of writing text input by the language model, the server sends the preset number of pieces of writing text to the frontend interface. The frontend interface displays the preset number of pieces of writing text in a preset area. If there has already been writing text displayed in the frontend interface, the frontend interface replaces the already displayed writing text with the writing text received in the current time.

According to the language model based writing aid method, a server acquires original text, where the original text may be writing text already generated and/or user input text; the server inputs the original text into a language model to generate a preset number of pieces of writing text, where the writing text and the original text have a correlation; and the server sends the preset number of pieces of writing text to a frontend interface. In the present disclosure, the server realizes generation of writing text by using a language model, so that the server can aid an author to accomplish writing creation. In addition, by generating multiple pieces of writing text each time and repeating the above steps for multiple times, the server realizes generation and extension of the writing text, and increases the diversity of the writing text.

Figure 3:
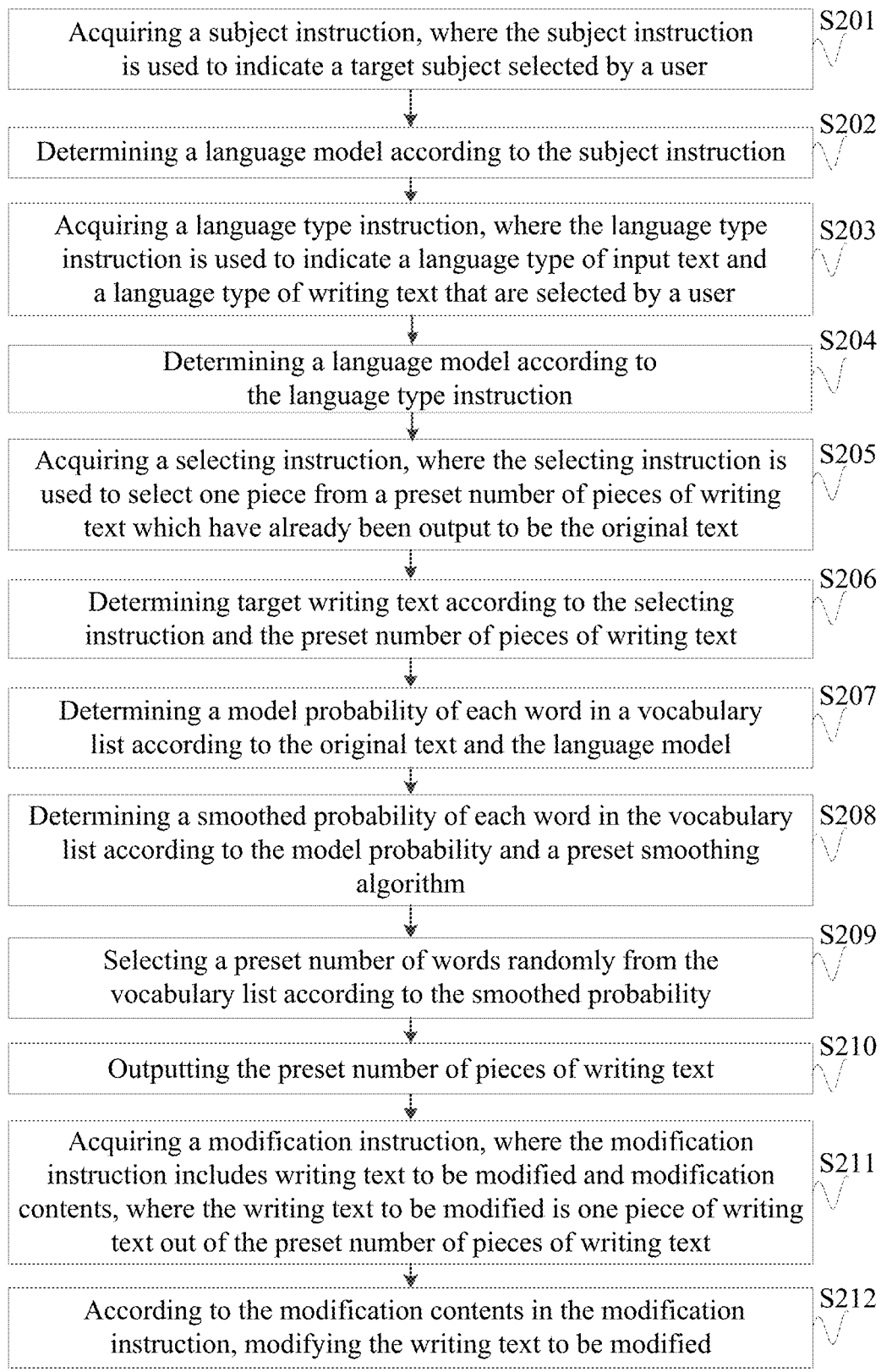
FIG. 3 is a flowchart diagram of another language model based writing aid method according to an embodiment of the present disclosure.

FIG. 3 shows a flowchart diagram of another language model based writing aid method according to an embodiment of the present disclosure. On the basis of the embodiments as shown in FIG. 1 and FIG. 2, as shown in FIG. 3, taking a server as an execution body, the method according to this embodiment may include the following steps.

S201, acquiring a subject instruction, where the subject instruction is used to indicate a target subject selected by a user.

In the embodiment, subject options are displayed on the frontend interface. A user may select a subject by clicking a mouse, inputting a number or other methods. The subject options on the frontend interface may be used to select carriers for writing text, such as novel, poem, prose, etc. Or, the subject options on the frontend interface may be used to select types of writing text, such as romance, fantasy, interstellar, etc. Or, the subject options on the frontend interface may also be of multi-level. For example, when the user selects the novel as the carrier for writing text, the interface continues to display a secondary level option. The user may select romance, fantasy, interstellar or other types through this secondary level option.

When the user finishes the selection of a subject option, the frontend interface generates a subject instruction correspondingly, and sends the subject instruction to a backend server. A server acquires the subject instruction.

S202, determining a language model according to the subject instruction, where the language model is to be used to generate writing text of the target subject.

In the embodiment, the server selects a language model corresponding to the subject instruction from a plurality of language models according to the subject instruction. The server takes the language model as a language model used in generating writing text for a current time.

Before the method of the embodiment is executed, according to a preset subject option, the server may accordingly train a language model selected for each subject option. For example, the server may use poem samples to train a language model for poetry. Or, the server may use romance novel samples to train a language model for romance novels.

S203, acquiring a language type instruction, where the language type instruction is used to indicate a language type of input text and a language type of writing text that are selected by a user.

In the embodiment, language type options are displayed on the frontend interface. A user may select a language type by clicking a mouse, inputting a number or other methods. The language type options on the frontend interface may be used to select a language type for input text and a language type for writing text. Input text and output text may have the same language type. The language type may be Chinese, English, French, etc.

When the user finishes the selection of a language type option, the frontend interface generates a language type instruction correspondingly, and sends the language type instruction to a backend server. A server acquires the subject instruction.

S204, determining a language model according to the language type instruction, where the language model is capable of generating, according to input text of a language type that is specified by the language type instruction, writing text of the language type that is specified by the language type instruction.

In the embodiment, a server selects a language model corresponding to the language type instruction from a plurality of language models according to the language type instruction. The server takes the language model as a language model used in generating writing text for a current time.

Before the method of the embodiment is executed, according to a preset language type option, the server may accordingly train a language model for each language type option. For example, the server may use Chinese novels to train a language model of Chinese, and use English novels to train a language model of English.

S205, acquiring a selecting instruction, where the selecting instruction is used to select one piece from a preset number of pieces of writing text which have already been output to be the original text, where the writing text which has already been output is the writing text already generated.

In the embodiment, after outputting a preset number of pieces of writing text, a server may acquire a selecting instruction. The selecting instruction is used to select one piece of writing text from the preset number of pieces of writing text.

In an example, the selecting instruction is a selecting instruction input by a user, or, the selecting instruction is a selecting instruction generated by a backend server according to a preset rule.

In the example, the selecting instruction acquired by the server may be a selecting instruction executed and generated by the server. After outputting the preset number of pieces of writing text, the server may select one piece from the preset number of pieces of writing text according to a preset rule. The preset rule may be that the server randomly selects one piece from the preset number of pieces of writing text. Or, the preset rule may be that the server selects a certain piece of writing text, for example, selects the first piece, the second piece, etc.

Or, the selecting instruction acquired by the server may be a selecting instruction uploaded by the frontend interface. After the preset number of pieces of writing text output by the server is displayed on the frontend interface, a user may select one piece of writing text therefrom. The frontend interface generates a selecting instruction according to the user's instruction of selecting the piece of writing text, and uploads it to the server.

S206, determining target writing text according to the selecting instruction and the preset number of pieces of writing text, where the target writing text is the original text.

In the embodiment, after acquiring the selecting instruction, the server determines target writing text from the preset number of pieces of writing text according to the selecting instruction. The target writing text will be input in the language model again as original text.

For example, if the output text is writing text output by the server in the first time, then, in this embodiment, the selected target writing text will be used as input for the language model to generate writing text in the second time.

S207, determining a model probability of each word in a vocabulary list according to the original text and the language model.

In the embodiment, after the server inputs original text into the language model, the language model will sequentially output model probabilities for each word for writing text. The model probabilities for the first word for the writing text are generated by the language model according to the original text. The model probabilities for a subsequent word for the writing text are generated by the language model according to a word that has already been generated and the original text. The model probabilities for a word for writing text include model probabilities of respective words in the vocabulary list, and a sum of all probability values included in the model probabilities for a word for writing text is 1.

S208, determining a smoothed probability of each word in the vocabulary list according to the model probability and a preset smoothing algorithm.

In the embodiment, after acquiring model probabilities for a word for writing text, the server uses a smoothing algorithm to perform a smoothing operation on the model probabilities for the word for writing text to obtain smoothed probabilities for the word for writing text, the smoothed probabilities for the word for writing text include smoothed probabilities of respective words in the vocabulary list, and the sum of all probability values included in the smoothed probabilities for a word for writing text is 1. The distribution of various probability values included in the smoothed probabilities for a word for writing text is more averaged than the distribution of various probability values included in the model probabilities for a word for writing text. For example, in the model probabilities for a word for writing text, a model probability of a word in the vocabulary list may be up to 0.99, however, in the smoothed probabilities for a word for writing text upon a smoothing process, it may occur that smoothed probabilities of multiple words in the vocabulary list may be in a similar level.

Specifically, during the smoothing process, the server firstly performs scaling uniformly on a smoothing model, and then performs probability normalization on the scaled model to obtain smoothed probabilities.

S209, selecting a preset number of words randomly from the vocabulary list according to the smoothed probability, where the preset number of words is respectively used to generate a preset number of pieces of writing text.

In the embodiment, the server randomly selects a preset number of words from the vocabulary list according to smoothed probabilities for a word for writing text. For example, the server may assign a smoothed probability of each word in the vocabulary list to a value range within 0-1 according to the smoothed probability of each word in the vocabulary list. The server randomly generates a value of 0-1, and the word in the vocabulary list corresponding to a value range that the generated value is within is the word that is selected.

In each piece of writing text, model probabilities for a subsequent word for writing text are generated by the language model according to a word that has already been generated and the original text. Therefore, the number of pieces of writing text actually generated is much greater than the preset number. For example, when the preset number is 3 and the number of words for writing text is 4, the process of generating the writing text by the language model may include the following steps.

Step 1: The server acquires model probabilities for a first word for writing text. The server calculates smoothed probabilities for the first word according to the model probabilities and a preset smoothing algorithm. The server randomly determines three words in the vocabulary list according to the smoothed probabilities. The three words are respectively first words of three pieces of writing text, and the three pieces of writing text are named as writing text 1, writing text 2, and writing text 3, respectively.

Step 2: In writing text 1, the server generates model probabilities for a second word according to the first word and the original text. According to the model probabilities for the second word in writing text 1, the server calculates smoothed probabilities for the second word, and randomly determines three words. The three words form three pieces of writing text together with the first word of writing text 1, respectively named as writing text 1.1, writing text 1.2, and writing text 1.3.

Step 3: In writing text 2, the server generates model probabilities for a second word according to the first word and the original text. According to the model probabilities for the second word in writing text 2, the server calculates smoothed probabilities for the second word, and randomly determines three words. The three words form three pieces of writing text together with the first word of writing text 2, respectively named as writing text 2.1, writing text 2.2, and writing text 2.3.

Step 4: In writing text 3, the server generates model probabilities for a second word according to the first word and the original text. According to the model probabilities for the second word in writing text 3, the server calculates smoothed probabilities for the second word, and randomly determines three words. The three words form three pieces of writing text together with the first word of writing text 3, respectively named as writing text 3.1, writing text 3.2, and writing text 3.3.

. . .

Step 39: In writing text 3.3.2, the server generates model probabilities for a fourth word according to the preceding 3 words and the original text. According to the model probabilities for the fourth word in writing text 3, the server calculates smoothed probabilities for the fourth word, and randomly determines three words. The three words form three pieces of writing text together with the preceding three words of writing text 3, respectively named as writing text 3.3.2.1, writing text 3.3.2.2, and writing text 3.3.2.3.

Step 40: In writing text 3.3.3, the server generates model probabilities for a fourth word according to the preceding 3 words and the original text. According to the model probabilities for the fourth word in writing text 3, the server calculates smoothed probabilities for the fourth word, and randomly determines three words. The three words form three pieces of writing text together with the preceding three words of writing text 3, respectively named as writing text 3.3.3.1, writing text 3.3.3.2, and writing text 3.3.3.3.

Step 41: After Step 40, the server acquires a total of 81 pieces of writing text. The server calculates a sum of probabilities for each writing text according to smoothed probability of respective determined words in the 81 pieces of writing text.

Step 42: The server determines, according to sums of probabilities for the 81 pieces of writing text, 3 pieces of writing text whose sums of probabilities are top three as writing text to be output.

S210, outputting the preset number of pieces of writing text.

Step S210 is implemented in a similar manner as Step S103 in the embodiment of FIG. 2, which will not be repeated in the embodiment herein.

S211, acquiring a modification instruction, where the modification instruction includes writing text to be modified and modification contents, where the writing text to be modified is one piece of writing text out of the preset number of pieces of writing text.

In the embodiment, after the frontend interface displays the preset number of pieces of writing text output by the server, a user may select one piece of writing text as writing text to be modified. The user performs a modification on the writing text to be modified. The frontend interface generates a modification instruction according to the user-selected writing text to be modified and the modification contents. The frontend interface sends the modification instruction to the server.

The user may select per time one piece of writing text as the writing text to be modified. The user may modify multiple pieces of writing text in the frontend interface through multiple modifications. In the process, the frontend interface generates multiple modification instructions according to the user's multiple modification operations, and uploads the multiple modification instructions to the server.

S212, according to the modification contents in the modification instruction, modifying the writing text to be modified.

In the embodiment, after receiving a modification instruction uploaded by the frontend interface, the server parses writing text to be modified and modification contents in the modification instruction. The server modifies, according to the modification contents, corresponding writing text to be modified.

According to the language model based writing aid method provided in the present disclosure, subject options are displayed on a frontend interface. When the user finishes the selection of a subject option, the frontend interface generates a subject instruction correspondingly, and sends the subject instruction to a backend server. The server selects a language model corresponding to the subject instruction from a plurality of language models according to the subject instruction. After outputting a preset number of pieces of writing text, the server may acquire a selecting instruction which is used to select one piece of writing text from the preset number of pieces of writing text. The server determines target writing text from the preset number of pieces of writing text according to the selecting instruction. After the server inputs original text into the language model, the language model will sequentially output model probabilities for respective words in writing text. The server uses a smoothing algorithm to perform a smoothing operation on the model probabilities for the respective words to obtain smoothed probabilities. The server randomly selects a preset number of words from the vocabulary list according to the smooth probabilities of the respective words. The preset number of words are used to generate a preset number of pieces of writing text. The server outputs the preset number of pieces of writing text. After the frontend interface displays the preset number of pieces of writing text output by the server, a user may select one piece of writing text as writing text to be modified. The user modifies the writing text to be modified. After receiving a modification instruction uploaded by the frontend interface, the server parses writing text to be modified and modification contents in the modification instruction. In the present disclosure, the server increases probabilities for respective words in the vocabulary list to be selected by converting model probabilities into smoothed probabilities. In addition, the server selects a preset number of words from the smoothed probabilities to generate writing text, thereby increasing the diversity of the writing text and reduces the possibility of replication of the writing text. In the present disclosure, the server may further increase the flexibility of the writing aid method by selecting a subject through a subject instruction and modifying writing text through a modification instruction, such that the writing text is not limited to outputs and types set by a system.

On the basis of the foregoing embodiments, taking a server as an execution body, the embodiment further includes training a language model. The language model mainly uses Transformer-xl architecture. The Transformer-xl architecture is an improved model architecture based on Transformer architecture, mainly to solve the problem of long sequences. In addition, deep learning model architectures similar to the Transformer-xl architecture, such as CNN (Convolutional Neural Network), RNN (Recurrent Neural Network), and LSTM (Long-Short Term Memory), may all be used to train the language model used in the present disclosure. Based on the Transformer-xl architecture, in order to enable the language model to have a long text memory, in the embodiment, a memory module (memory) is further provided in the language model architecture. The use of the memory module (memory) enables the language model to memorize text that has appeared far away, thereby improving the language logic of writing text. Based on the overall consideration of the long text memory and device capability, a memory with a length of 1280 is applied to the language model of the embodiment.

Specifically, the language model may be trained with steps including:

Step 1, a server acquires training data.

In this step, the training data acquired by the server is sample data of a preset subject. For example, when the preset subject is a poem, the sample data acquired by the server are poems. For example, when the preset subject is a novel, the sample data acquired by the server are novels. For example, when the preset subject is a romance novel, the sample data acquired by the server are romance novels.

The training data acquired by the server may originate from a network. For example, the server may crawl corresponding sample data from the network through a web crawler. Or, the training data acquired by the server may originate from a database. For example, the server may acquire corresponding sample data by purchasing data from a database or downloading data from a public database.

Step 2, the server performs data cleaning on the training data.

In this step, after acquiring the training data, the server needs to clean the training data. Data cleaning includes deleting spaces in the training data and unifying the character spacing in the training data. For example, when the original text includes full-width and half-width characters, the server may unify the half-width characters into full-width characters.

Step 3. The server performs standardization on the training data.

In this step, the server needs to convert input data into a preset format of the language model. For example, the server may connect the training data into a string. Taking a novel as an example, the server may delete carriage return characters between paragraphs to connect all the paragraphs of the novel. The server may also connect a chapter head of a novel to an end of a previous chapter by connecting text contents. Moreover, the server may also connect contents of a current chapter directly to a chapter head of the novel by connecting text contents. The server may determine an ID corresponding to each character or word in the training data according to a preset vocabulary list. The server uses the ID to replace the character or word in the training data.

Step 4. The server inputs the training data into an initial model of the Transformer-xl architecture to perform training, and obtains a language model.

In this step, in the training data input by the server, a character or a word is a character or a word replaced with an ID. That is, the training data is an ID sequence. The server inputs the training data into an initial model to perform training, and obtains a language model. The language model can be used to generate writing text based on input text.

According to the language model based writing aid method provided in the present disclosure, a server implements training of a language model through steps including acquiring training data, cleaning and standardizing the training data, and model training. In the present disclosure, by training the language model, the server may generate a preset number of pieces of writing text based on original text, so that an effect of aiding a user to accomplish writing creation is achieved, thereby improving the diversity of writing text.

Figure 4:
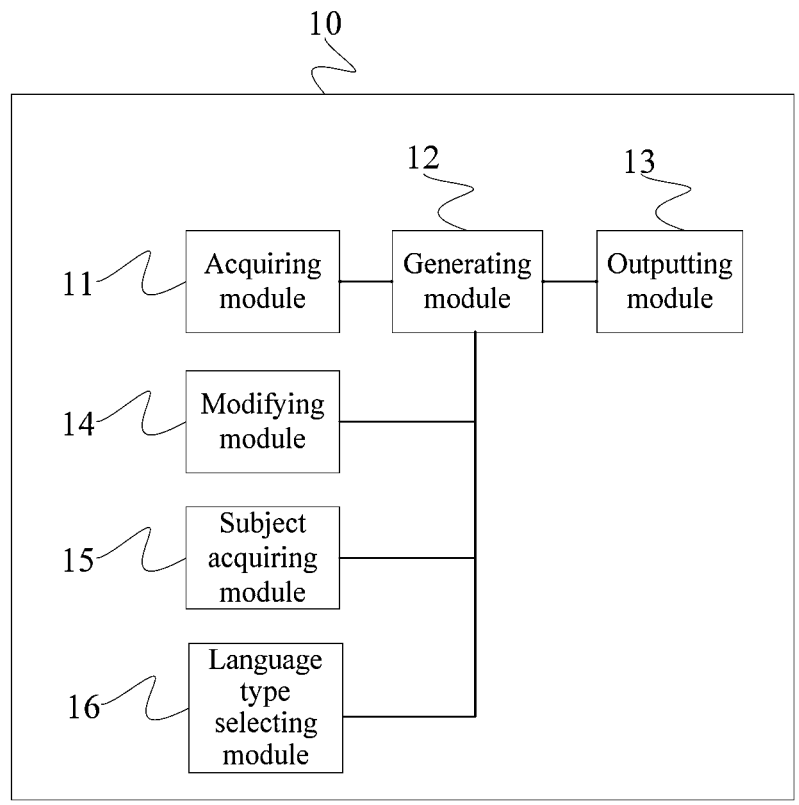
FIG. 4 is a structural schematic diagram of a language model based writing aid apparatus according to an embodiment of the present disclosure.

FIG. 4 shows a structural schematic diagram of a language model based writing aid apparatus according to an embodiment of the present disclosure. As shown in FIG. 4, the language model based writing aid apparatus 10 according to the embodiment is used to implement operations in any of the foregoing method embodiments corresponding to the server. The language model based writing aid apparatus 10 according to the embodiment includes:

an acquiring module 11, configured to acquire original text, where the original text includes writing text already generated and/or user input text, where the writing text already generated is one piece out of a preset number of pieces of writing text which are generated in a most recent time;

a generating module 12, configured to input the original text into a language model trained beforehand to generate a preset number of pieces of writing text, where contents of the writing text include text contents obtained based on an extension of the original text; and an outputting module 13, configured to output the preset number of pieces of writing text.

In an example, the language model based writing aid apparatus 10 further includes:

a modifying module 14, configured to acquire a modification instruction, where the modification instruction comprises writing text to be modified and modification contents, where the writing text to be modified is one piece of writing text out of the preset number of pieces of writing text; and modify the writing text to be modified according to the modification contents in the modification instruction.

In another example, the language model based writing aid apparatus 10 further includes:

a subject acquiring module 15, configured to acquire a subject instruction, where the subject instruction is used to indicate a target subject selected by a user; and determine a language model according to the subject instruction, where the language model is to be used to generate writing text of the target subject.

In another example, the language model based writing aid apparatus 10 further includes:

a language type selecting module 16, configured to acquire a language type instruction, where the language type instruction is used to indicate a language type of input text and a language type of writing text that are selected by a user; and determine a language model according to the language type instruction, where the language model is capable of generating, according to input text of a language type that is specified by the language type instruction, writing text of the language type that is specified by the language type instruction.

The language model based apparatus writing aid 10 provided in the embodiments of the present disclosure can execute the foregoing method embodiments; for specific implementation principles and technical effects therebetween, reference may be made to the foregoing method embodiments, and details will not be described in the embodiment herein.

Figure 5:
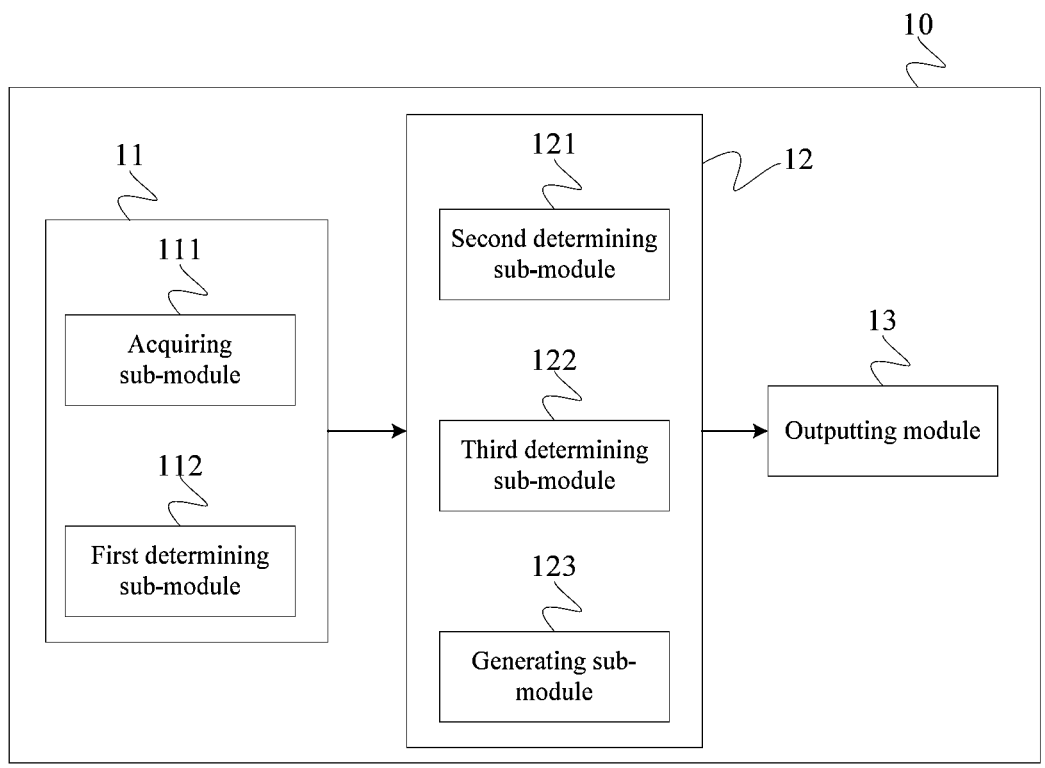
FIG. 5 is a structural schematic diagram of another language model based writing aid apparatus according to an embodiment of the present disclosure.

FIG. 5 shows a structural schematic diagram of another language model based writing aid apparatus according to an embodiment of the present disclosure. On the basis of the embodiment as shown in FIG. 4, as shown in FIG. 5, the language model based writing aid apparatus 10 according to the embodiment is used to implement operations in any of the foregoing method embodiments corresponding to a server.

The acquiring module 11 includes:

an acquiring sub-module 111, configured to acquire a selecting instruction, where the selecting instruction is used to select one piece from the preset number of pieces of writing text which have already been output to be the original text, where the writing text which has already been output is the writing text already generated; and a first determining sub-module 112, configured to determine target writing text according to the selecting instruction and the preset number of pieces of writing text, where the target writing text is the original text.

In an example, the selecting instruction is a selecting instruction input by a user, or, the selecting instruction is a selecting instruction generated by a backend server according to a preset rule.

The generating module 12 includes a second determining sub-module 121, configured to determine a model probability of each word in a vocabulary list according to the original text and the language model;

a third determining sub-module 122, configured to determine a smoothed probability of each word in the vocabulary list according to the model probability and a preset smoothing algorithm; and a generating sub-module 123, configured to select a preset number of words randomly from the vocabulary list according to the smoothed probability, and generate a preset number of pieces of writing text.

The language model based writing aid apparatus 10 provided in the embodiments of the present disclosure can execute the foregoing method embodiments; for specific implementation principles and technical effects therebetween, reference may be made to the foregoing method embodiment, and details will not be described in the embodiment herein.

Figure 6:
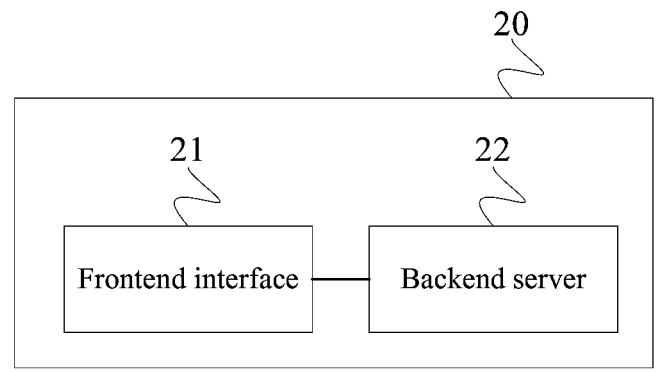
FIG. 6 is a structural schematic diagram of a language model based writing aid system according to an embodiment of the present disclosure.

FIG. 6 shows a structural schematic diagram of a language model based writing aid system according to an embodiment of the present disclosure. As shown in FIG. 6, the language model based writing aid system 20 includes: a frontend interface 21 and a backend server 22.

The frontend interface 21 and the backend server 22 may be run on a same device. Or, the frontend interface 21 and the backend server 22 may also be run on different devices. For example, the frontend interface may be displayed on a user terminal. The user terminal may include terminal devices such as mobile phones, computers, and tablets. For example, the backend server may be run on a server.

The frontend interface 21 is specifically configured to implement interactions with a user. The interactions may include acquiring original text input by the user, acquiring the user's selecting instruction, acquiring the user's modification instruction, acquiring the user's subject instruction or the like. On acquiring the aforementioned interaction information, the frontend interface 21 may upload the aforementioned interaction information to the backend server 22. The frontend interface 21 may also acquire writing text fed back by the backend server 22, and display the writing text on a display interface.

Figure 7:
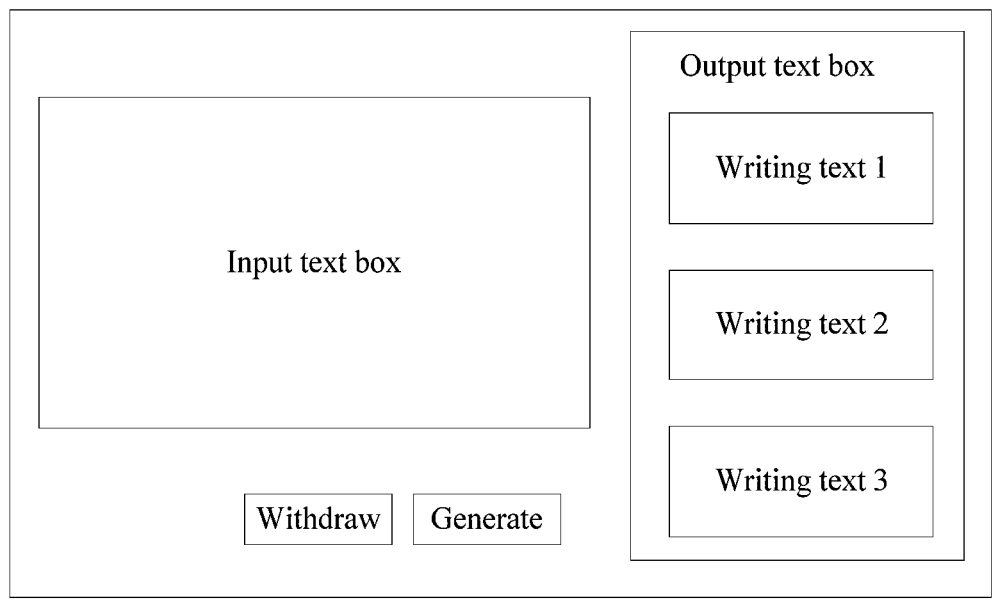
FIG. 7 is a schematic diagram of a page of a frontend interface according to an embodiment of the present disclosure.

FIG. 7 shows a schematic diagram of a page of a frontend interface. The page includes an input text box, an output text box and buttons. A user may enter input text in the input text box. The frontend interface acquires, through the input text box, the input text entered by the user. The output text box is configured to output writing text fed back by the backend server. As shown in FIG. 7, when the preset number is 3, the frontend interface can output three pieces of writing text.

The buttons may include a withdraw button and a generate button. When a user clicks the withdraw button, writing text displayed in the output text box is returned to writing text generated in a previous time. For example, a user clicks the withdraw button after writing text generated in a fifth time is displayed in the output text box, at this time, the frontend interface will display writing text generated in a fourth time. When the user clicks the generate button, the frontend interface will upload input text and/or a selecting instruction in the input text box.

In addition, a user may also click on one piece of writing text to realize a selection of the piece of writing text. After the user selects the piece of writing text in the frontend interface, the user may modify the writing text in the frontend interface.

In addition, the user may achieve the purpose of using a computer to aid writing creation through clicking the generate button for multiple times, clicking the withdraw button or the generate button for multiple times, entering input text for multiple times, modifying writing text for multiple times, etc.

Figure 8:
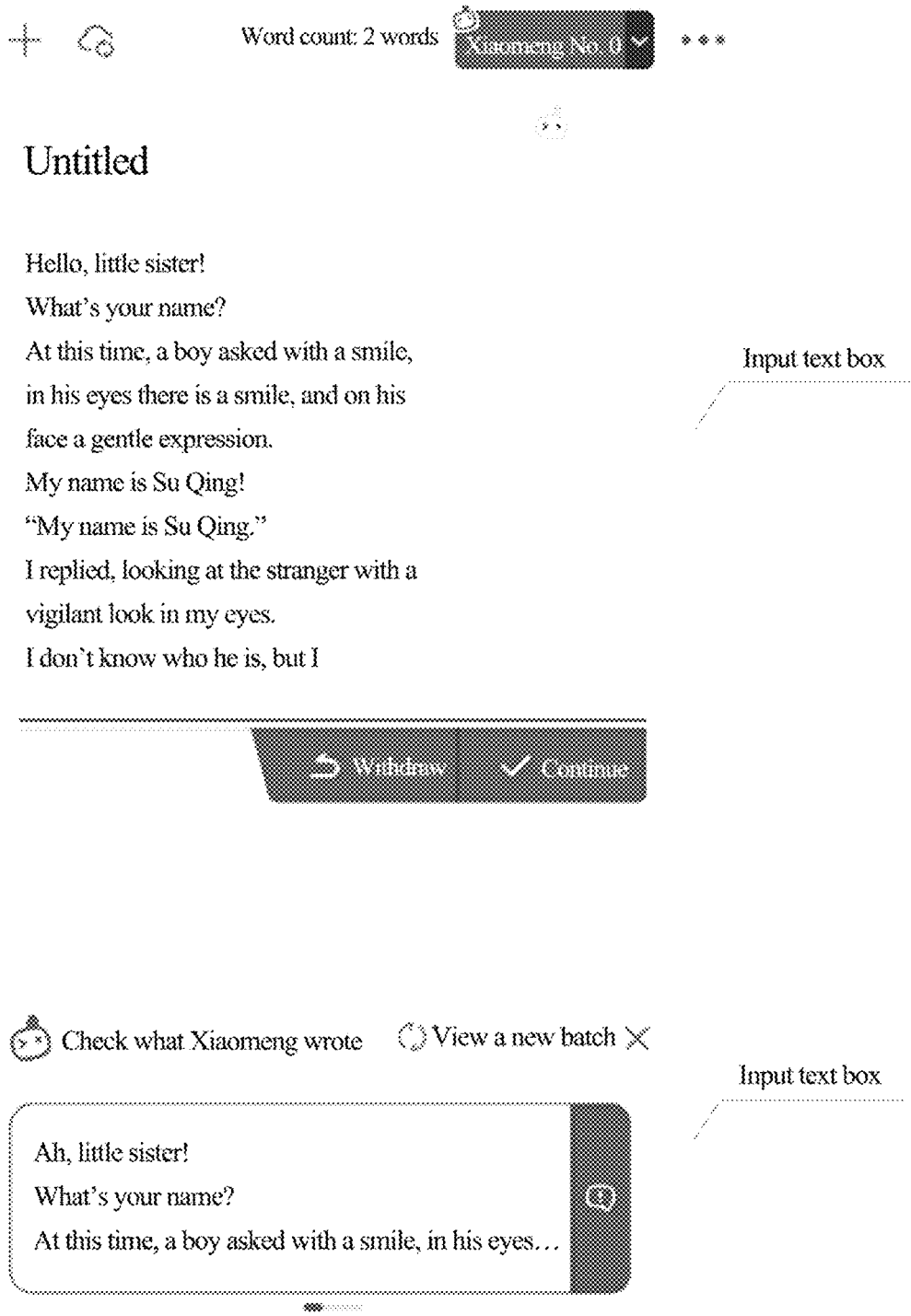
FIG. 8 is a schematic diagram of a page of another frontend interface according to an embodiment of the present disclosure.

FIG. 8 is a schematic diagram of a page of another frontend interface. The page is usually applied to a mobile terminal. The page includes an input text box and an output text box. A user may enter input text in the input text box. When the user clicks the "continue" button, the frontend interface may upload the input text to the backend server. The frontend interface may also receive writing text fed back by the backend server, and display the writing text in the input text box. Only one piece of writing text is displayed in the input text box. When a user needs to view other pieces of writing text, the user may click the button "view a new batch" on the output text box to realize an operation of changing writing text. When the user clicks the "withdraw" button, the frontend interface may display the input text that the user entered in a previous time. At the same time, the frontend interface may also display the writing text that the backend server fed back to the frontend interface in the previous time.

The backend server 22 is specifically configured to generate a preset number of pieces of writing text according to original text, and feedback the writing text to the frontend interface. In a specific implementation process, the backend server mainly uses a Flask framework to build an interface. The frontend interface may implement information exchange with the backend server by requesting the interface built by the backend server.

Figure 9:
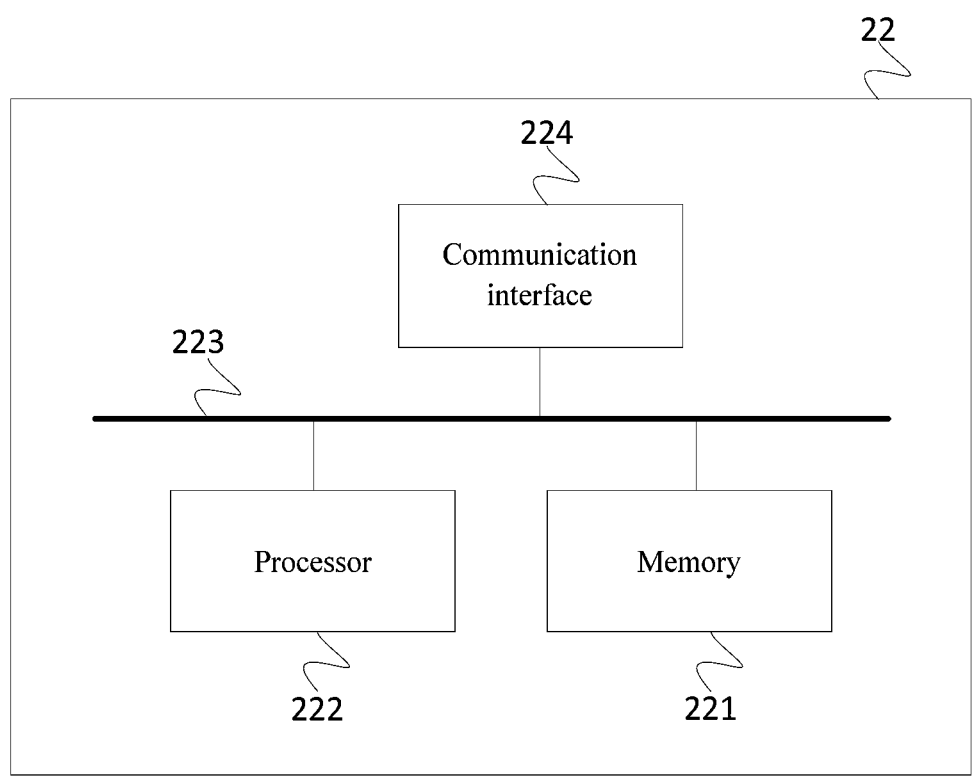
FIG. 9 is a schematic diagram of hardware structure of a server according to an embodiment of the present disclosure.

When the backend server 22 is run on a server, the hardware structure of the server may be as shown in FIG. 9, which includes a memory 221, a processor 222, and a communication interface 224.

The memory 221 is configured to store a computer program. The memory 221 may include a high-speed random access memory (RAM), and may also include a non-volatile memory (NVM), such as at least one disk memory, and may also be a USB flash disk, a mobile hard disk, a read-only memory, a magnetic disk or a compact disc, etc.

The processor 222 is configured to execute a computer program stored in a memory to implement the language model based writing aid method in the foregoing embodiments. For details, reference may be made to related description in the foregoing method embodiments. The processor 222 may be a central processing unit (CPU), or a general-purpose processor, a digital signal processor (DSP), an application specific integrated circuit (ASIC), etc. The general-purpose processor may be a microprocessor or the processor may also be any conventional processor or the like. The steps of the method disclosed in combination with the disclosure may be directly embodied as being executed by a hardware processor, or executed by a combination of hardware and software modules in the processor.

Optionally, the memory 221 may be separated from or integrated with the processor 222. When the memory 221 is a device separated from the processor 222, the server may further include a bus 223. The bus 223 is configured to connect the memory and the processor. The bus 223 may be an industry standard architecture (ISA) bus, a peripheral component interconnect (PCI) bus, or an extended industry standard architecture (EISA) bus, or the like. The bus may be divided into an address bus, a data bus, or a control bus, etc. For the convenience of presentation, the bus in the drawing of the present disclosure is not limited to only one bus or one type of bus.

The communication interface 224 may be connected to the processor 222 through the bus 223. The processor 222 may achieve communication with the frontend device 21 through the communication interface.

The language model based writing aid system 20 provided in the embodiments of the present disclosure can execute the foregoing method embodiments; for specific implementation principles and technical effects therebetween, reference may be made to the foregoing method embodiments, and details will not be repeated in the embodiment herein.

The present disclosure also provides a computer readable storage medium in which a computer program is stored, and the computer program is configured to implement the method provided in the foregoing embodiments when the computer program is executed by a processor.

The present disclosure also provides a computer program product which includes a computer program, and the computer program is stored in a computer readable storage medium. At least one processor of a device can read the computer program from the computer readable storage medium, and the at least one processor executes the computer program to enable the device to implement the method provided in the foregoing embodiments.

In the several embodiments provided in the present disclosure, it should be understood that the device and method disclosed may be implemented in other manners. For example, the device embodiments described above are merely illustrative. For example, the partition of the modules is only a logical function partition. There may be other manners for partition in a practical implementation, for example, multiple modules may be combined with or integrated into another system, or some features may be omitted or not executed. In addition, the mutual coupling or direct coupling or communication connection shown or discussed may be an indirect coupling or communication connection through some interfaces, devices or units, which may be electrical, mechanical or otherwise.

Various modules may be physically separated, for example, installed in different positions of one device, or installed in different devices, or distributed in multiple network elements, or distributed in multiple processors. The various modules may also be integrated, for example, installed in a same device, or integrated in a set of codes. Each module may exist in a form of hardware, or may also exist in a form of software, or may also be implemented in a form of a combination of software and hardware. In the present disclosure, some or all of the modules may be selected according to practical needs to achieve an objective of the solution of the embodiments.

Various modules, when integrated in a form of software function modules, may be stored in a computer readable storage medium. The above-mentioned software function modules are stored in a storage medium and include some instructions enabling a computer device (which may be a personal computer, a server, or a network device, etc.) or a processor to execute some steps of the method of the various embodiments of the present disclosure.

It should be understood that, although the steps in the flowchart in the foregoing embodiments are displayed in sequence as indicated by the arrows, these steps are not necessarily executed sequentially in the order indicated by the arrows. Unless explicitly specified herein, the execution of these steps is not strictly limited with respect to the order, and they may be executed in other orders. Moreover, at least some of the steps in the figures may include multiple sub-steps or multiple stages. These sub-steps or stages are not necessarily executed at the same time, but may be executed at different times, and the order of execution is not necessarily sequential. Rather, they may be executed in turn with or alternatively with other steps or at least some sub-steps or stages of other steps.

Finally, it should be noted that the above embodiments are only used to explain, rather than to limit, the technical solutions of the present disclosure. Although the present disclosure has been described in detail with reference to the foregoing embodiments, those of ordinary skill in the art should understand that modifications can be made to the technical solutions recorded in the foregoing embodiments, or some or all of the technical features thereof may be substituted by their equivalents, and such modifications or substitutions do not cause the nature of the corresponding technical solutions to deviate from the scope of the technical solutions of the embodiments of the present disclosure.

What is claimed is:

1. A language model based writing aid method, comprising:

acquiring original text, wherein the original text comprises at least one of writing text already generated and user input text, wherein the writing text already generated is one piece out of a first preset number of pieces of writing text which are generated in a most recent time;

inputting the original text into a language model trained beforehand to generate a second preset number of pieces of writing text, wherein contents of the second preset number of pieces of the writing text comprise text contents obtained based on an extension of the original text; and outputting the second preset number of pieces of writing text;

wherein when the language model is used to generate novels, and the second preset number is greater than 1, the obtaining the text contents based on the extension of the original text comprises following steps:

in a first time, extending an original text to obtain three different story lines with same points when the original text is the user input text, wherein the three different story lines with the same points are three novels corresponding to three pieces of writing text, respectively;

in a second time, continuing to extend story line based on a story line of one of the three novels according to an original text when the one of the three novels that are output in the first time is determined as the original text, so that story lines of three novels generated in the second time is obtained by extending a story line of the respective original text;

wherein after multiple times of generation, there is a correlation between a story line of each novel generated by the language model and the user input text, and in a process of generation for multiple times, three pieces of writing text generated in each time are all randomly generated on the basis of the original text.

2. The method according to claim 1, wherein when the original text comprises the writing text already generated, the acquiring the original text comprises:
   acquiring a selecting instruction, wherein the selecting instruction is used to select one piece from the second preset number of pieces of writing text which have already been output to be the original text, wherein the writing text which has already been output is the writing text already generated; and
   determining target writing text according to the selecting instruction and the second preset number of pieces of writing text, wherein the target writing text is the original text.

3. The method according to claim 1, wherein the selecting instruction is a selecting instruction input by a user, or, the selecting instruction is a selecting instruction generated by a backend server according to a preset rule.

4. The method according to claim 1, wherein the inputting the original text into the language model trained beforehand to generate the second preset number of pieces of writing text comprises:
   determining a model probability of each word in a vocabulary list according to the original text and the language model;
   determining a smoothed probability of each word in the vocabulary list according to the model probability and a preset smoothing algorithm; and
   selecting a preset number of words randomly from the vocabulary list according to the smoothed probability, and generating a preset number of pieces of writing text.

5. The method according to claim 1, further comprising:
   acquiring a modification instruction, wherein the modification instruction comprises writing text to be modified and modification contents, wherein the writing text to be modified is one piece of writing text out of the second preset number of pieces of writing text; and
   modifying the writing text to be modified according to the modification contents in the modification instruction.

6. The method according to claim 1, when the language model comprises multiple language models for different subjects, the method further comprises:
   acquiring a subject instruction, wherein the subject instruction is used to indicate a target subject selected by a user; and
   determining a language model according to the subject instruction, wherein the language model is to be used to generate writing text of the target subject.

7. The method according to claim 1, when the language model comprises multiple language models for different language types, the method further comprises:
   acquiring a language type instruction, wherein the language type instruction is used to indicate a language type of input text and a language type of writing text that are selected by a user; and
   determining a language model according to the language type instruction, wherein the language model is capable of generating, according to input text of a language type that is specified by the language type instruction, writing text of the language type that is specified by the language type instruction.

8. A non-transitory computer readable storage medium, storing thereon a computer program which, when being executed by a processor, implements the language model based writing aid method according to claim 1.

9. A language model based writing aid apparatus, comprising:
   a memory, a processor and a communication interface interconnected via a bus;
   the memory storing thereon a computer program, wherein the processor is configured to execute the computer program to:
   acquire original text, wherein the original text comprises at least one of writing text already generated and user input text, wherein the writing text already generated is one piece out of a first preset number of pieces of writing text which are generated in a most recent time;
   input the original text into a language model trained beforehand to generate a second preset number of pieces of writing text, wherein contents of the second preset number of pieces of the writing text comprise text contents obtained based on an extension of the original text; and
   output the second preset number of pieces of writing text;
   wherein the processor is further configured to:
   when the language model is used to generate novels, and the second preset number is greater than 1, in a first time, extend an original text to obtain three different story lines with same points when the original text is the user input text, wherein the three different story lines with the same points are three novels corresponding to three pieces of writing text, respectively; in a second time, continue to extend story line based on a story line of one of the three novels according to an original text when the one of the three novels that are output in the first time is determined as the original text, so that story lines of three novels generated in the second time is obtained by extending a story line of the respective original text;
   wherein after multiple times of generation, there is a correlation between a story line of each novel generated by the language model and the user input text, and in a process of generation for multiple times, three pieces of writing text generated in each time are all randomly generated on the basis of the original text.

10. The apparatus according to claim 9, wherein the processor is configured to:
    acquire a selecting instruction, where the selecting instruction is used to select one piece from the second preset number of pieces of writing text which have already been output to be the original text, where the writing text which has already been output is the writing text already generated; and
    determine target writing text according to the selecting instruction and the second preset number of pieces of writing text, where the target writing text is the original text.

11. The apparatus according to claim 9, wherein the processor is configured to:
    the selecting instruction is a selecting instruction input by a user, or, the selecting instruction is a selecting instruction generated by a backend server according to a preset rule.

12. The apparatus according to claim 9, wherein the processor is configured to:
    determine a model probability of each word in a vocabulary list according to the original text and the language model;
    determine a smoothed probability of each word in the vocabulary list according to the model probability and a preset smoothing algorithm; and select a preset number of words randomly from the vocabulary list according to the smoothed probability, and generate a preset number of pieces of writing text.

13. The apparatus according to claim 9, wherein the processor is configured to:
   acquire a modification instruction, where the modification instruction includes writing text to be modified and modification contents, where the writing text to be modified is one piece of writing text out of the second preset number of pieces of writing text; and
   modify the writing text to be modified according to the modification contents in the modification instruction.

14. The apparatus according to claim 9, wherein the processor is configured to:
   acquire a subject instruction, where the subject instruction is used to indicate a target subject selected by a user; and
   determine a language model according to the subject instruction, where the language model is to be used to generate writing text of the target subject.

15. The apparatus according to claim 9, wherein the processor is configured to:
   acquire a language type instruction, where the language type instruction is used to indicate a language type of input text and a language type of writing text that are selected by a user; and
   determine a language model according to the language type instruction, where the language model is capable of generating, according to input text of a language type that is specified by the language type instruction, writing text of the language type that is specified by the language type instruction.

16. A language model based writing aid system, comprising: a frontend interface and a backend server;
   wherein the frontend interface is configured to upload acquired original text to the backend server, and display writing text fed back by the backend server;
   the backend server is configured to generate a second preset number of pieces of writing text according to the original text, and feedback the writing text to the frontend interface;
   wherein the backend server is configured to:
   acquire the original text uploaded from the frontend interface, wherein the original text comprises at least one of writing text already generated and user input text, wherein the writing text already generated is one piece out of a first preset number of pieces of writing text which are generated in a most recent time;
   input the original text into a language model trained beforehand to generate the second preset number of pieces of writing text, wherein contents of the second preset number of pieces of the writing text comprise text contents obtained based on an extension of the original text; and
   output the second preset number of pieces of writing text;
   wherein the backend server is further configured to:
   when the language model is used to generate novels, and the second preset number is greater than 1, in a first time, extend an original text to obtain three different story lines with same points when the original text is the user input text, wherein the three different story lines with the same points are three novels corresponding to three pieces of writing text, respectively; in a second time, continue to extend story line based on a story line of one of the three novels according to an original text when the one of the three novels that are output in the first time is determined as the original text, so that story lines of three novels generated in the second time is obtained by extending a story line of the respective original text;
   wherein after multiple times of generation, there is a correlation between a story line of each novel generated by the language model and the user input text, and in a process of generation for multiple times, three pieces of writing text generated in each time are all randomly generated on the basis of the original text.

* * * * *